D. G. FLETCHER.
Coffee Pot.

No. 24,261.

Patented May 31, 1859.

WITNESSES

INVENTOR
D. G. Fletcher

UNITED STATES PATENT OFFICE.

D. G. FLETCHER, OF RACINE, WISCONSIN, ASSIGNOR TO HIMSELF AND HENRY WEISKOPF, OF SAME PLACE.

COFFEE-POT.

Specification of Letters Patent No. 24,261, dated May 31, 1859.

*To all whom it may concern:*

Be it known that I, D. G. FLETCHER, of Racine, in the county of Racine and State of Wisconsin, have invented a new and Improved Coffee-Pot; and I do hereby declare that the following is a full, clear, and exact description of the same, reference being had to the accompanying drawings, making a part of this specification, in which—

Figure 1:
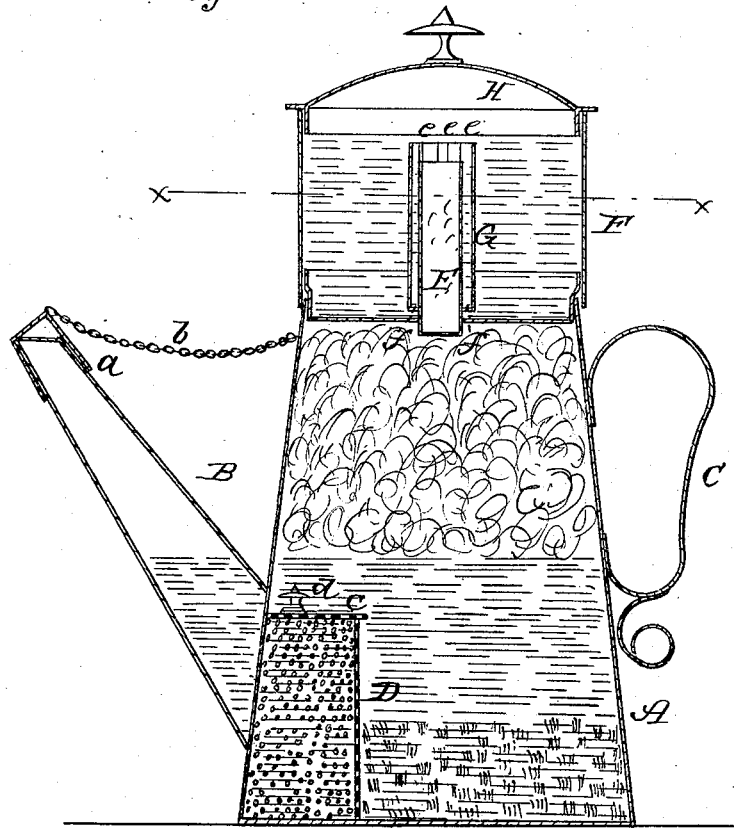
Figure 2:
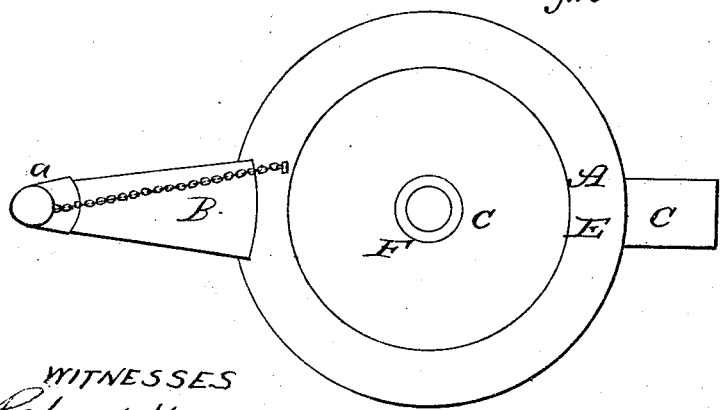

Figure 1, represents a vertical central section of a coffee pot constructed according to my invention. Fig. 2, is a horizontal section of the same, the line $x, x$, in Fig. 1, indicating the plane of section.

Similar letters of reference indicate corresponding parts in the two figures.

This invention consists in protecting the spout by a box like strainer with a hinged top so that the liquid coffee runs freely and that the strainer can easily be cleaned from both sides.

To enable those skilled in the art to fully understand, construct and use my invention, I will proceed to describe its construction and operation.

A, is a coffee pot constructed of tin or britannia metal in the usual form and manner, the spout B, being covered by cap $a$, which is secured to the body of the pot by a short chain $b$; and a handle C, serves to hold and handle the pot. The spout is protected by a strainer D, which instead of being placed into the spout and flush with the sides of the pot, is made in the form of a little box, having its top $c$, hinged so that the same can be raised by means of the knob $d$, and that the strainer can be cleaned out from the inside as well as from the outside.

The top of the pot A, is closed by a reservoir E, which fits tightly over the edge of the pot, so as to prevent the escape of steam or vapor, and this reservoir communicates with the interior of the pot by means of a tube F, which is open at both ends, and another larger tube G, is placed over the first tube F, being secured to the same by short arms $e$, which are attached to its top, and the tube G, is closed above but open below and it does not extend entirely down to the bottom of the reservoir, so that a crevice $f$, is left whereby the communication between the interior of the pot and the reservoir is effected. A cover H, fits over the reservoir E, and this cover and the reservoir are made of such size that when the reservoir is not used the cover fits into the top of the pot and serves as a cover for the same, in the usual manner.

The operation is as follows:—Coffee is prepared in the pot in the usual manner by pouring hot water over the ground coffee, and the pot is closed by placing over it the reservoir E, which is now filled with cold water just high enough to cover the top of the tube G, and the water enters through the crevice $f$, into the space between the two tubes G, and F, where it comes in contact with the steam and vapor from the coffee, and the pressure of the steam prevents the water from rising high enough in this space so that it does not overflow the tube F. As the tube F, is cooled by being in contact with the cold water, the steam from the coffee is partially condensed by passing up through, and striking the sides of the tube F, and that part of the steam which is not condensed is absorbed by the water in the space between the two tubes F, and G, and as soon as the coffee in the pot cools down and the pressure of the steam ceases to act on the water in the space between the two tubes, this water, which is now impregnated with the aroma from the coffee, runs back into the pot. As a partial vacuum is formed in the pot when the steam condenses, the two tubes act as a sort of siphon and all that portion of the water which has absorbed the aroma of the coffee is drawn down into the pot. When all the coffee has been drawn from the pot, and if the same is to be cleaned, this operation can be effected with more ease and more perfectly with my pot, the strainer being so arranged that access can be had to the same from both sides so that all the fine particles which usually accumulate in the strainer, and which with the ordinary arrangement are reached with difficulty, can easily be cleaned out with my strainer, as both sides of the same can be reached with equal facility.

Having thus described my invention, what I claim as new and desire to secure by Letters Patent, is—

The box-like strainer D, arranged with a hinged top $c$, so that access can be had to the same from the inside as well as from the outside and that the same can easily be cleaned, substantially as described.

D. G. FLETCHER.

Witnesses:
M. W. CARROLL,
PATRICK HANLEY.